March 30, 1965 W. H. JONES 3,175,687
FLOTATION UNIT
Filed Sept. 24, 1962 4 Sheets-Sheet 4
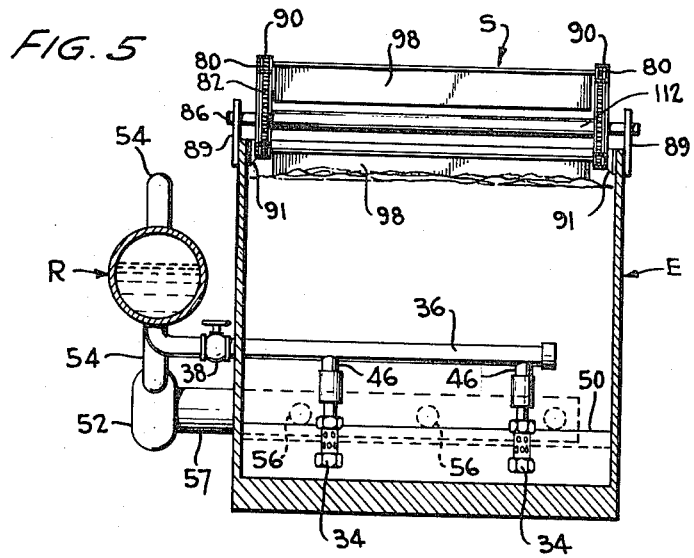
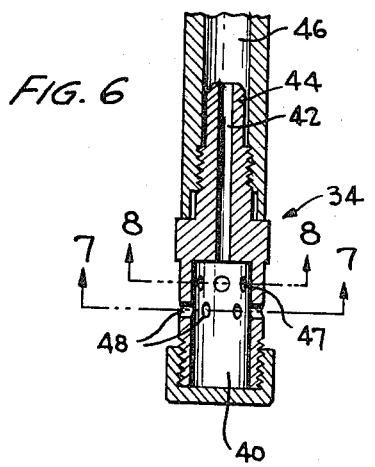
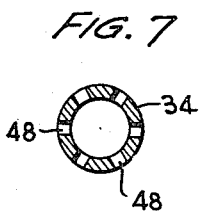
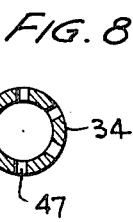
INVENTOR
WARREN H. JONES
BY Watson, Cole, Grindle, & Watson
ATTORNEYS

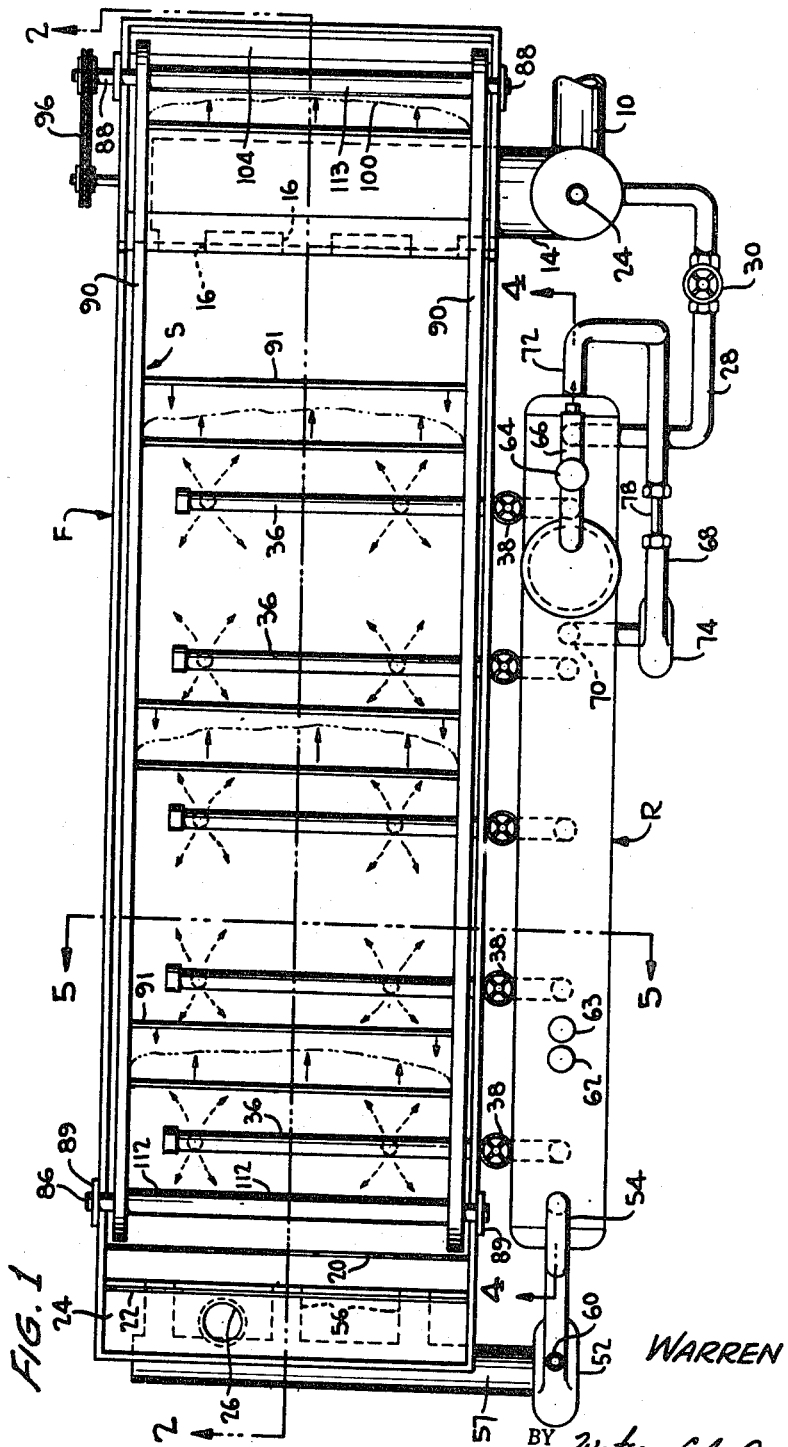

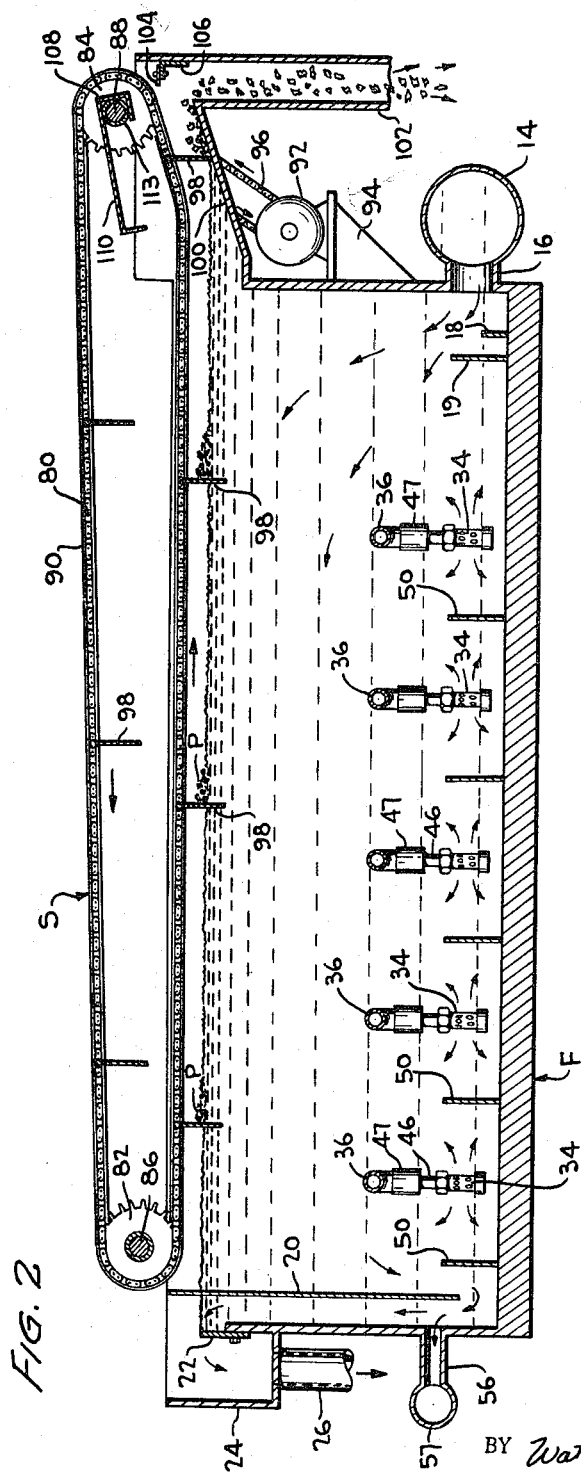
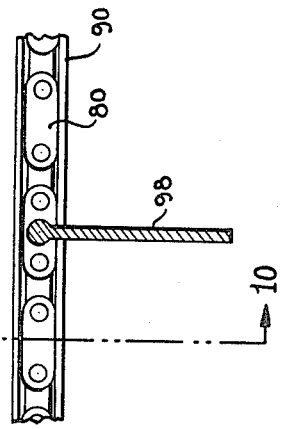
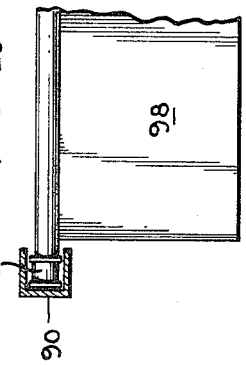

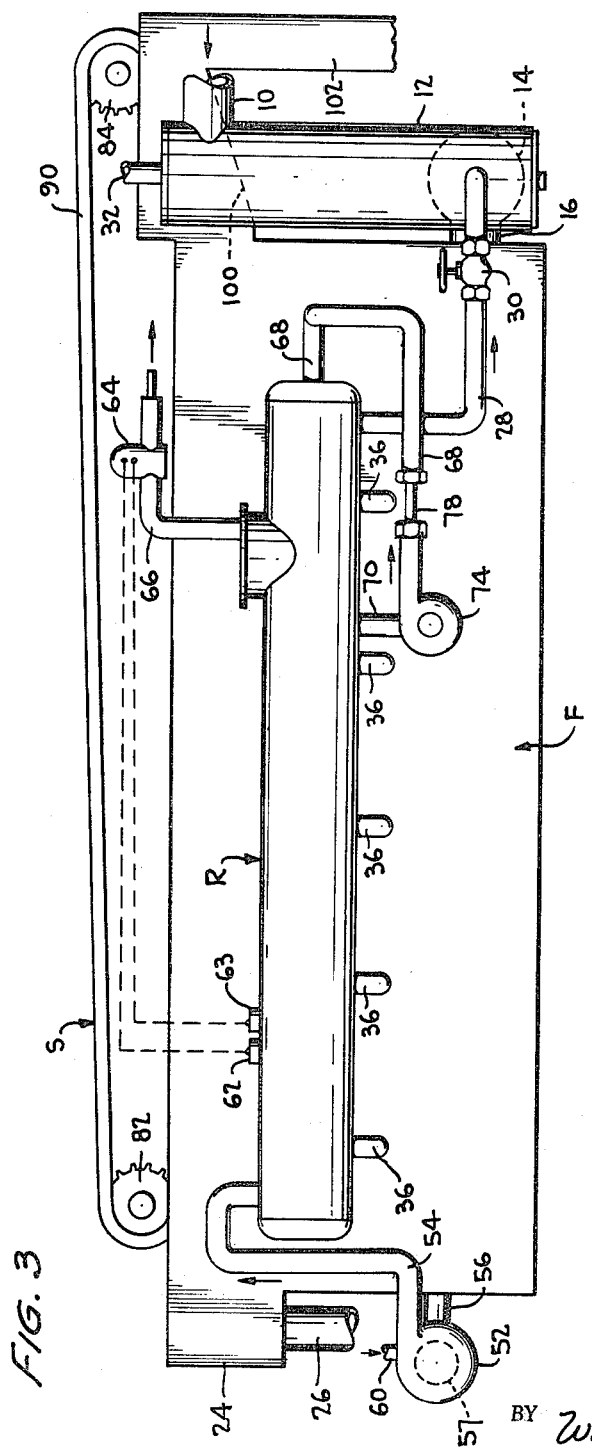

United States Patent Office 3,175,687
Patented Mar. 30, 1965

3,175,687
FLOTATION UNIT
Warren H. Jones, Morristown, N.J., assignor to Komline-Sanderson Engineering Corporation, Peapack, N.J., a corporation of New Jersey
Filed Sept. 24, 1962, Ser. No. 225,692
2 Claims. (Cl. 210—120)

This invention relates to improvements in a dissolved air flotation clarification or a concentration of solid particles in a liquid. More particularly it constitutes an improvement over the type of apparatus and process such as disclosed in U.S. Patent 2,242,139 to Munroe, granted May 13, 1941, and Patent 2,793,185 to Albrektsson et al. granted May 21, 1957.

As is shown by these patents, the process of dissolved air flotation clarification or concentration is accomplished by minutely small bubbles of air or gas attaching themselves to solids or water immiscible liquids in the flotation tank and buoying these particles to the surface of the liquid in the tank where they may then be readily removed by skimming or other suitable operation.

The amount and rate at which the particles may be floated, and therefore the efficiency of the operation, is dependent upon the proportionate amount of air or other gas supplied released within the liquid for flotation. It follows then that the efficiency and performance of a flotation unit or apparatus can be increased by increasing the proportionate amount of gas which is dissolved in and carried by the liquid into the flotation tank to thereafter rise to the surface of the liquid within the tank in the form of small bubbles. Although the ensuing detailed description relates more particularly to the dissolution of air in water and its subsequent introduction into the flotation tank, it is to be understood that it is intended to include such other liquids and gases as may prove adapted for use in carrying out the invention.

Normally the air and water are continuously admitted to a pressure retention tank from which the pressurized solution of air and water is then delivered into the flotation tank.

It is the primary object of the present invention to dissolve a maximum proportionate amount of air in the water within the retention tank, to thus increase the efficiency of the flotation operation, while maintaining the size of the retention tank comparatively small as contrasted to the flotation tank proper. In order to achieve this primary object I have conceived of constantly supplying air and water into the retention tank under pressure and in such relative proportions as to provide a cushion of undissolved air in the tank above the water, and then of recirculating air from this cushion back through the water within the retention tank. The preferred means of accomplishing this is through a conduit having its intake and discharge ends communicating with the retention tank below the level of water therein in such manner that the conduit and tank together define a closed flow circuit for water. There is produced through this conduit a continuous flow of water into which air from the air cushion within the retention tank is continuously introduced, the air and water then being discharged beneath the water level within the retention tank.

It is a still further object to maintain the water within the retention tank at the desired level within a given range of tolerance by releasing from the tank such amounts of excess air from the air cushion as may be necessary for this purpose. Preferably this operation is carried out by known leveling controlling devices adapted to open an air release valve whenever the water level reaches a specified minimum.

Although one might ordinarily be led to believe that simply delivering the air and water into a common retention tank under pressure and maintaining them there over a given period of time would automatically result in dissolving air within the water to the point of saturation, the actual practice of the present invention has proved otherwise. For instance, it has been found that where operation of the means for injecting air from the air cushion back into the water is discontinued, it becomes necessary to release substantially greater amounts of air from the retention tank over a given period of time in order to maintain the water level therein than is the case during normal operation of the invention. It has also been found that in actual practice where the aerated water from the retention tank is utilized for treatment of liquid within a flotation tank the efficiency of such treatment is greatly increased by use of the invention.

The foregoing as well as other objects and novel features of the invention are exemplified in the accompanying drawings illustrating the preferred embodiment of the invention. In the accompanying drawings:

FIGURE 1 is a plan view of a flotation unit having the invention incorporated therein;

FIGURE 2 is a cross section in a vertical plane through the unit of FIGURE 1 same being taken on the line 2—2 of FIGURE 1, FIGURE 3 is a side elevation of the structure shown in FIGURE 1 as seen from the side on which the retention tank is mounted, FIGURE 4 is a vertical cross section through the retention tank on the line 4—4 of FIGURE 1, showing the interior structure thereof, FIGURE 5 is a transverse cross section in a vertical plane on the line 5—5 of FIGURE 1, FIGURE 6 is an enlarged detail sectional view through one of the back pressure distributors, FIGURES 7 and 8, respectively, are cross sectional views through the back pressure distributors shown in FIGURE 6, these being taken along the line 7—7 and 8—8, respectively, of FIGURE 6, FIGURE 9 is an enlarged fragmentary elevation through a portion of the sprocket chain and one of the skimmer blades constituting parts of the skimmer mechanism; and FIGURE 10 is a further detail view of the line 10—10 of FIGURE 9.

Referring now in detail to the accompanying drawings, and first considering the general organization of the several major components as shown in FIGURES 1, 2, 3 and 5, these comprise the more or less conventional flotation tank generally designated F within which the flotation is carried out to form a layer or sludge or float on top of the water within the tank, together with suitable sludge removal means exemplified by the skimmer mechanism S, and a suitable retention tank or vessel R constituting the source from which a solution of air in water at a pressure in excess of atmospheric pressure is delivered into the influent within the flotation tank.

In accordance with well-known theory, at or prior to the time the water and air solution is introduced into the flotation tank the pressure thereon is released so that the major portion of the dissolved air may come out of solution to form a dispersion of extremely minute bubbles of air which in rising to the surface of the water within the flotation tank tend to adhere to and carry with them any small particles of solid matter or water immiscible liquids such as grease or oil. The particles thus arising to the surface and tending to form a surface layer of sludge or float, designated P in FIGURE 2, are removed in known manner by the skimmer apparatus S.

Although the specific structural details of the flotation tank are by no means essential to the invention, these will nevertheless be described to the extent necessary to facilitate an intelligent understanding of the construction and operation of the particular flotation tank illustrated.

Thus the tank F is of generally rectangular shape in plan, being enclosed on all four sides and its bottom, but in the present instance opening upwardly. The influent, consisting of a mixture of water and solids or other liquids which are immiscible in water, will be led into the flotation tank through an influent delivery conduit 10, thence downwardly through the cylindrical inlet riser 12 and into the horizontal manifold or header 14 having one or more inlet ducts or ports 16 communicating with the inlet end of the tank F through its end wall, as shown best in FIGURE 2. These ports 16, of which three are shown in the present drawings, are distributed preferably over substantially the entire width of the inlet end of the tank. The incoming streams of influent entering the tank through the ports 16 impinge against and are substantially dispersed by the upstanding baffles 18 and 19 so that the body of liquid within the tank may remain relatively quiescent and undisturbed.

The entire body of liquid within the flotation tank will thus enter at the right-hand end of the tank as seen in FIGURE 2 and will move slowly and with minimum turbulence toward the left-hand or discharge end of the tank as seen in FIGURE 2. By the time it reaches the discharge end of the tank the flotation action will have been completed and the clarified effluent adjacent the bottom of the tank will be caused to flow downwardly beneath the transverse baffle 20 thence upwardly between said baffle and the discharge end of the tank for subsequent discharge over the adjustable weir 22, all as indicated by the arrows in FIGURE 2. It may be received in a usual collecting trough 24 for removal through discharge conduit 26.

The air for the flotation process is dissolved under pressure substantially in excess of atmospheric pressure within the retention tank R and the pressurized solution of air in water is then admitted into the bottom portion of the flotation tank at any of various desired points. As the pressurized solution of air in water is delivered into the tank it is released from pressure, causing the air, or a large portion thereof, to come out of solution to form a substantially colloidal dispersion of extremely fine air bubbles in water. It is the action of these bubbles in rising upwardly through the contents of the flotation tank which is relied upon for the flotation action. As is well-known, these extremely fine air bubbles will tend to adhere to particles of foreign matter which may be either solids or water immiscible liquids admitted with the influent and constituting part thereof.

It will generally be found preferable to admit all or the major portion of the aerated water into the inlet riser 12 through a delivery pipe 28 under the control of a manually actuated valve 30 interposed within said pipe. This pipe 28 communicates with the discharge end of the retention tank R in a position below the level of the water therein and delivers such water through the valve 30 into the lower end of the inlet riser 12, from whence it passes into the manifold 14 and through the port 16 into the flotation tank together with the influent. Any unduly large air bubbles which may be formed within the inlet riser 12 will immediately float to the top of said riser and escape through the air vent 32 at its upper end. It is desirable to permit the escape of such large air bubbles before they pass into the flotation tank in order to avoid the creation of turbulence within the tank. The extremely small bubbles which are formed within the inlet riser and more particularly in the flotation tank will slowly rise toward the surface of the water in the tank, adhering to and carrying with them the particles of solids or water immiscible liquid ingredients of the influent, whereby these may be removed by action of the skimmer mechanism S.

Since the dissolved air will tend to slowly come out of solution over a period of time during which the flotation tank contents will be progressing toward the discharge end of the tank, it will be seen that the bubble formation and the flotation action from air injected into the inlet riser will normally continue throughout most of the length of the tank.

However, depending on the exact nature and consistency of the influent and the impurities therein to be subjected to the flotation process it may be found desirable to inject the solution of air and water at various other locations along the tank and adjacent its bottom in order to insure the provision of adequate amounts of air to carry out an efficient flotation operation.

For this purpose there are shown a plurality of admission fittings 34 disposed at intervals lengthwise of the bottom of the flotation tank. Since these fittings are identical and are identically associated with the retention tank and flotation tank respectively it will suffice to furnish a detailed description of but one of them. Thus it will be seen that each fitting 34 is carried by a transversely extending conduit 36 within the flotation tank adjacent its bottom.

Each conduit 36 extends outwardly in fluid tight relation through one of the side walls of the flotation tank and thence communicates with the interior of the retention tank R through its bottom and of course below the level of water in the retention tank. Obviously two or more admission fittings 34 may be carried within the flotation tank by each conduit 36 as is shown best in FIGURE 5. Preferably each conduit 36 is provided with a manually controllable valve 38 for rendering its admission fixtures or fittings 34 selectively operative or inoperative and for controlling the rate of delivery through said fittings.

Each of the admission fittings 34 defines an enclosed preferably cylindrical chamber 40, the fitting 34 being formed with an externally threaded nipple 42 having a restricted passage or orifice 44 therethrough communicating with a branch pipe 46 which in turn communicates through coupling sleeve 47 (FIGURES 2 and 5) with delivery pipe 36. It will be seen that the nipple 42 is threaded into the branch pipe 46 as shown in FIGURE 6.

The orifices 44, by restricting the passage of fluid through them, maintain a back pressure in the delivery pipes 46 and 36 and the retention tank R, but release such pressure as the solution of air and water is admitted into the chambers 40, whereby the air may immediately commence coming out of solution to form an air water dispersion which escapes from each chamber 40 through the two series of radially directed perforations 47 and 48. It is thus rather widely dispersed in substantially all lateral directions within the flotation tank in order to reduce the resulting turbulence to a minimum. Also for the purpose of reducing turbulence there is provided across the bottom of the flotation tank a series of upstanding transverse baffles each designated 50, the arrangement being such that each of the fittings 34 projects downwardly between a pair of relatively adjoining such baffles 50.

Thus in any event it will be seen that by virtue of the several orifices 44 and/or the control valves 30 and 38 the contents of the retention tank R is admitted into the flotation tank at a controlled rate such as to maintain the supply of air and water within the retention tank at operative levels and at operative pressures.

In accordance with known practice clear water or in other words water substantially free from solids, oils or the like is admitted into the retention tank at a substantially constant rate by means exemplified by the pump 52 and its delivery pipe 54 communicating with the retention tank R as shown in FIGURES 1 and 3.

Preferably the delivery pipe 54 communicates with the end of the tank R opposite from the end with which the discharge pipe or outlet 28 communicates so that normally, where the bulk of the air-water mixture is supplied to the flotation tank through the outlet 28, there will be a constant though relatively slow flow of the tank contents from the inlet toward the outlet or toward the right-hand in FIGURE 3.

Though the clear water may come from an outside source, it is desirable in most instances to derive this from the clear effluent produced by the flotation process. To this end, the intakes 56 for pump 52 are shown as communicating with the flotation tank interior at a location to draw off a portion of the clarified effluent passing upwardly between the baffle 20 and the adjacent end wall of the flotation tank. This may best be seen in FIGURE 2 of the drawings. The several intake pipes 56 are distributed across the width of the tank and all communicate with a common header 57 which in turn communicates with the intake side of the pump.

The air for the retention tank R may be introduced therein in any suitable manner so long as the air and water are both delivered in such relative proportions as to provide a cushion of undissolved air 58 under pressure in the upper part of the tank R as shown best in FIGURE 4. In the illustrative embodiment this air is introduced into pump delivery pipe 54, on the discharge side of the pump 52, by air conduit 60 adapted to receive air from any convenient source of air under pressure. This air is fed into the pump ouput in quantities somewhat greater than would be necessary to achieve 100% saturation of the water under the particular operating conditions such as water temperature, water and air pressures within the retention tank.

A specific advantage of this preferred arrangement is that a significant portion of the air from the air inlet 60 will be dissolved within the water flowing through delivery pipe 54 before it is discharged into the retention tank R. This mixture of air and water is purposely delivered downwardly through the upper portion of the tank R so that it will create turbulence as it falls downwardly to the surface of the water already within the tank and this turbulence will be increased by the fact that undissolved air will be carried downwardly beneath the surface of the water within the tank. These air bubbles, by rising upwardly through the surface will further increase the turbulence as well as the effective surface area of water which is exposed to contact with the air cushion 58 to thereby promote the dissolution of a portion of this air cushion within the water.

The water within the retention tank R is maintained at substantially a predetermined level, as by the conventional electrodes 62 and 63 shown in FIGURES 3 and 4, these being arranged in known manner to control the solenoid actuated air release valve 64 which controls air discharge passage 66.

In accordance with the invention it has been found possible to dissolve an unexpectedly great proportionate amount of the air within the water contained in retention tank R by injecting air from the cushion 58 beneath the surface of water in tank R, and more particularly by utilizing a continuous flow of water from the retention tank through an aspirating device having an air intake communicating with the air cushion 58.

As is shown best in FIGURES 1, 3 and 4 such an aspirating device is provided by a loop of conduit, generally designated 68, having its intake and discharge ends 70 and 72, respectively, communicating with the interior of the tank R. A conventional rotary pump 74 is shown as operatively connected within the conduit loop 68 to produce a flow of fluid therethrough from its intake towards its discharge end.

For continuously introducing air from the cushion 58 into the conduit 68, the latter is provided with a constriction 74, best shown in FIGURE 4, and this constriction is placed in communication with the air cushion 58 through an air inductor tube 76. The water passing through the constriction 74 in cooperation with the communicating air induction tube 76 functions in the manner of a conventional injector or jet pump, with the result that air drawn into the stream of water at the constriction is partially dissolved due to the relatively increased pressure between the constriction and the discharge end 72, and the water with any undissolved air bubbles is then discharged at 72 beneath the level of water within the tank R in a direction which is counter to the movement of water through said tank from one end to the other. This constant resulting stream of air bubbles beneath the water surface and in contact with the water provides for increased dissolution of the air.

Moreover these bubbles are discharged over the intake 70 for the conduit loop 68 whereby any bubbles drawn into the intake together with the water will be passed through the conduit loop 68 and subjected to the somewhat higher water pressure within this loop whereby to still further increase the dissolution of the air within the water. Back pressure within the loop 68 may, if desired, be caused by a constricted section 78 of the loop, though it will be apparent that this section 78 is not essential inasmuch as ample back pressure for the purposes of the invention will be provided by the nozzle constriction 74.

The skimming mechanism S functions continuously to remove the floating sludge, grease or other material from the surface of the water within the tank F in a more or less conventional manner. As will be seen from FIGURES 1 and 2, the skimmer S comprises a pair of identical but relatively laterally spaced sprocket chains, both designated 80, and each disposed for movement through an endless circuit around the sprocket wheels 82 and 84. These wheels are carried by shafts 86 and 88 rotatably journaled in bearings 89 at the opposite ends of the flotation tank. In order to prevent these chains from sagging, it is desirable to guide them in their movement as by means of the channel-shaped rigid trackways 90. The trackways are supported on sleeves 112 and 113 (FIGURE 1) journaled on the respective shafts 86, 88 or as shown in FIGURE 5, may be supported from rails 91 secured to the upper edges of flotation tank F. These trackways are shaped to coincide with the paths pursued by the respective chains, whereby to positively guide them. It will be seen that each chain is received slidably within the channeled portion of its respective trackway or guide 90. For driving the chains 80—80 there is shown in FIGURE 2 a conventional drive motor 92 fixedly supported on the bracket 94 at the end of the tank. This motor 92 is operatively connected to the shaft 88 by a chain drive 96.

The skimmer blades 98 extend transversely between and are swingably supported at regular intervals by the relatively transversely spaced sprocket chains 80 so that they will normally depend swingably from these chains in substantially vertical planes.

The lower runs of the chains move in a direction from left to right as indicated by the arrow in FIGURE 2 at a level such that the lower ends of the respective blades project beneath the surface of the water within the tank F and move along parallel to the water surface from one end of the tank to the other, carrying with them the accumulated sludge or float on the water surface. The levels of the water with respect to the blades 98, and thus the depth of penetration of the blades may be readily governed by adjustment of the weir 22.

As each blade 98 emerges from the flotation tank and is withdrawn from the water therein it moves along and in wiping engagement with an upwardly inclined sludge discharge ramp 100, carrying with it the sludge or float and delivering same into the upper end of the discharge chute 102 which communicates with the upper end of the ramp 100.

For cleaning the blade before its next operative run, there is provided a wiper or scraper blade 104 supported by an angle bracket 106 from the rear wall of the discharge chute in position to successively engage the forward operative faces of the respective blades 98 as they commence their upward movement around the sprockets 84 prior to embarking on their respective return runs. The rear face of each such blade is subsequently wiped or scraped by engagement with the scraping edge or corner 108 of a scraper 110 which is supported in stationary position by stationary sleeve 113.

While the operation of the entire flotation unit has already been described in some detail, it may prove helpful to summarize same at this point, giving particular attention to the operation of those parts constituting the subject matter of the invention.

Thus the influent is fed continuously into the flotation tank F through the inlet 10, the inlet riser 12, manifold 14 and inlet ports 16. After entering the tank at the right-hand end as seen in FIGURE 2, the influent moves gradually toward the discharge end, turbulence being maintained at a minimum by the baffles 18, 19, 20 and 50. During its movement through the tank, the air-water mixture under pressure is delivered into the tank F from retention tank R. Upon entering the flotation tank, this air-water mixture is released from pressure with the result that there is formed an extremely fine substantially colloidal suspension of air bubbles in water. As these fine bubbles rise to the surface of the tank they adhere to and carry with them particles of solids or water immiscible liquids which form a coating of sludge or float upon the surface of the liquid within the tank. Thus surface coating is continuously removed as by the action of the skimmer mechanism S.

Thus by the time the contents of the tank F reaches the discharge end of the tank and commences to pass beneath the baffle 20 and thence upwardly between it and the end wall of the tank for discharge over the weir 22, it will be fully clarified.

This clarified effluent in the preferred embodiment serves as a source from which the supply of water is drawn by the pump 52 and thence delivered into the retention tank R together with a supply of air under pressure which is preferably injected into the pump discharge pipe 54. This clarified water is thus recycled from the flotation tank through the retention tank R and thence back into the flotation tank together with the air which will have been dissolved in it within the retention tank.

The air under pressure is fed through the air line 60 for delivery into the water line 54 on the discharge side of the pump 52 under pressure and in quantities slightly greater than necessary to achieve 100% saturation under prevailing conditions within the tank R. In actual practice, air has been fed at the rate of approximately 1.35 cubic feet of free air per 100 gallons of water flow through the pump 52 under conditions of water temperature pressure and flow rate within the tank R such as would normally require but 1.12 cubic feet of free air per 100 gallons of water in order to achieve 100% saturation of the air in the water. The air is mixed and at least partially dissolved in the water within the pipe 54 by the velocity, turbulence and pressure of the water within the pipe before it enters the retention tank R. The air water mixture is discharged adjacent one end of the retention tank in a downward direction to penetrate beneath the surface of the water within the tank and to create a flow pattern toward the relatively opposite end of the tank where the major portion of the flow will normally be discharged through pipe 28 for delivery into the inlet riser 12 of the flotation tank.

Any air not dissolved in the incoming water will rise to the top of the retention tank to create a controlled air cushion. Moreover, the rising air in the form of bubbles will create an increased surface area of water to promote additional air dissolution from the air cushion 58. It will be noted that the horizontally disposed cylindrical tank R will provide a maximum surface area for air water contact with minimum sacrifice of its effective retention capacity.

To further enhance the dissolution of air in the water within the retention tank R, air from the cushion 58 is continuously reintroduced into the water by the ejector device including the orifice 74 and the air inlet 76 communicating therewith. This air is partially dissolved within the water passing through the conduit 68 under pressure created by the pump 74 and the water and air, including both dissolved and undissolved air, emerging from the end of the conduit 74 back into the retention tank is intimately mixed with the water. Moreover, the water velocity and the bubbles of free air create agitation within the retention tank resulting in increasing the amount of dissolution of air into the water directly from the cushion 58. Also by virtue of directing the flow from the discharge of conduit 72 in a generally upstream direction counter to the prevailing flow of water through the tank R it will be seen that maximum contact between the air and water is achieved.

Normally the pump 74 is expected to discharge at about ten to twenty-five pounds per square inch greater pressure than that prevailing within the retention tank, but need have a capacity only a fraction that of the pump 52. Because of the relatively low capacity of the reaeration pump 74 as well as its low discharge pressure the pump will normally operate economically with but small expenditure of power.

In this application I have shown and described only the preferred embodiment of the invention, simply by way of illustration of its practice. However, it will be appreciated that the invention is capable of other and different embodiments and that its various details are subject to alteration in obvious manner, all without departing from the invention as defined by the appended claims.

Having thus described the invention, I claim:

1. In a flotation unit wherein a pressurized solution of air in water is supplied into a flotation tank, the combination comprising an enclosed retention tank for continuously forming said solution, means for constantly supplying water into said retention tank under a pressure in excess of atmospheric, means for constantly supplying air into said tank at a similar pressure and at a volumetric rate in excess of the rate at which the air is dissolved within the water, whereby to maintain in the tank a cushion of undissolved air above the water, means for withdrawing the resulting solution of air and water from said retention tank for delivery to the flotation tank at a controlled rate less than the combined rates of delivery of the air and water into the tank, means for automatically releasing excess air from the retention tank as required to maintain a substantially constant level of water therein, a conduit having intake and discharge ends within said retention tank below the water level therein, said conduit having a constriction therein within the retention tank, a pump operatively connected to said conduit to produce a continuous flow of liquid therethrough, and an air inductor tube disposed wholly within the retention tank and supported solely by said conduit, said air inductor tube establishing communication between said constriction and the said air cushion, whereby to continuously inject air into the water flowing through said conduit.

2. In a flotation unit wherein a pressurized solution of air in water is supplied into a flotation tank, the combination comprising an enclosed retention tank for continuously forming said solution, means for constantly supplying water into said retention tank under a pressure in excess of atmospheric, means for constantly supplying air into said tank at a similar pressure and at a volumetric rate in excess of the rate at which the air is dissolved within the water, whereby to maintain in the tank a cushion of undissolved air above the water, means for withdrawing the resulting solution of air and water from said retention tank for delivery to the flotation tank at a controlled rate less than the combined rates of delivery of the air and water into the tank, means for automatically releasing excess air from the retention tank as required to maintain a substantially constant level of water therein, a conduit having intake and discharge ends within said retention tank below the water level therein, said discharge end of the conduit being spaced in said given horizontal direction from said means for constantly supplying water, said discharge end being directed horizontally and contra to said given horizontal direction, said discharge end having a constriction therein within the retention tank, a pump operatively connected to said conduit to produce a continuous flow of liquid therethrough, and an air inductor tube disposed wholly within the retention tank and supported solely by said conduit, said air inductor tube extending vertically from said constriction to a location above the said constant level of water in the retention tank and establishing communication between said constriction and the said air cushion, whereby to continuously inject air into the water flowing through said conduit.

References Cited by the Examiner

UNITED STATES PATENTS

| | | | |
|---|---|---|---|
| 1,407,258 | 2/22 | Conners | 210—44 X |
| 2,242,139 | 5/41 | Munroe | 210—540 X |
| 2,248,177 | 7/41 | Karlstrom | 210—205 |
| 2,793,185 | 5/57 | Albrektsson et al. | 210—44 |
| 2,876,863 | 3/59 | Kivari | 210—44 X |

FOREIGN PATENTS 491,623    9/38    Great Britain.

REUBEN FRIEDMAN, *Primary Examiner.*

HERBERT L. MARTIN, HARRY B. THORNTON,
*Examiners.*